A. N. WHITE.
FOLDING BED.
APPLICATION FILED MAR. 31, 1920.

1,366,758.

Patented Jan. 25, 1921.
2 SHEETS—SHEET 1.

INVENTOR:
Albert N. White
by Macleod, Calver, Copeland & Dike
Attys.

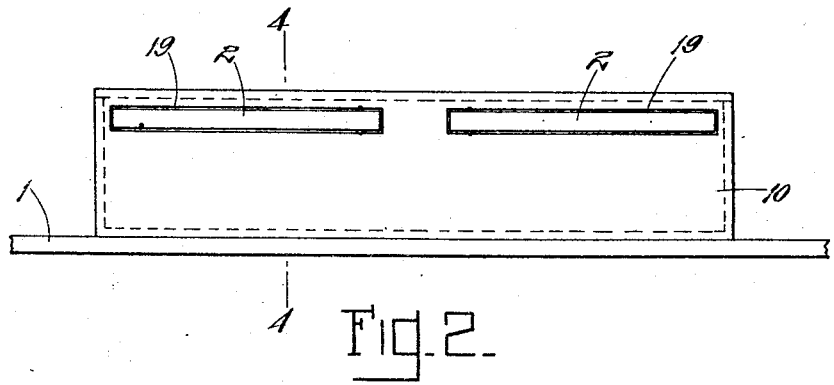
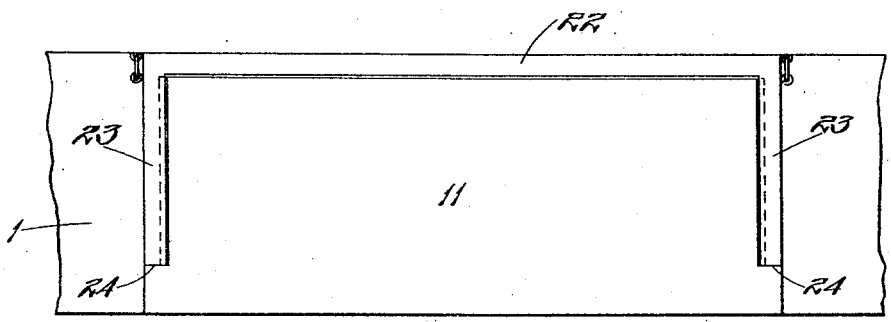
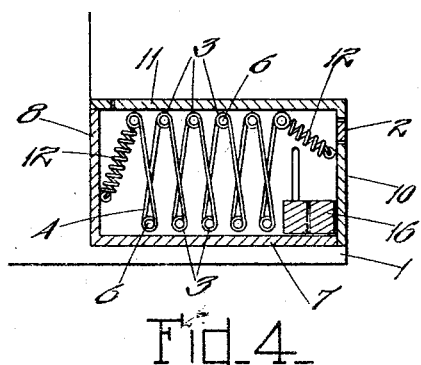
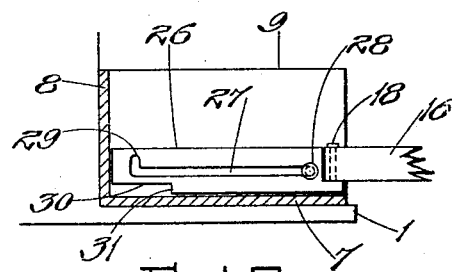

UNITED STATES PATENT OFFICE.

ALBERT N. WHITE, OF HILL, NEW HAMPSHIRE.

FOLDING BED.

1,366,758.  Specification of Letters Patent.  Patented Jan. 25, 1921.

Application filed March 31, 1920. Serial No. 370,190.

*To all whom it may concern:*

Be it known that I, ALBERT N. WHITE, a citizen of the United States, residing at Hill, county of Merrimack, State of New Hampshire, have invented a certain new and useful Improvement in Folding Beds, of which the following is a specification, reference being had therein to the accompanying drawings.

The invention relates to a new and useful improvement in folding beds. It is especially intended for use with automobiles, but not limited to such use. Parties who are touring the country in an automobile frequently desire to take along with them a camping outfit, but such an outfit is usually cumbersome to carry in an automobile. The object of the present invention is to provide a folding spring bed which may be folded into compact form within a box which forms a part of the bed itself, and which when used in connection with an automobile can be readily secured to the running board of the automobile, the running board forming a support for one end of the bed when in use, and the bed being provided with folding legs which when the bed is in use may be opened out to support the outer end of the bed.

The invention will be fully understood when taken in connection with the accompanying drawings, and the novel features thereof will be pointed out and clearly defined in the claims at the close of this specification.

In the drawings, Figure 1 is a perspective view of a folding bed embodying the invention, showing it in its extended form for use and showing a portion of the running board of an automobile for the head support, and showing the canopy top.

Fig. 2 is a front elevation showing the bed in its folded position on the running board.

Fig. 3 is a plan view of the bed in the position shown in Fig. 2.

Fig. 4 is a section on line 4—4 of Fig. 2.

Fig. 6 shows a modified form of connection of the side bars of the bed with the box to make the connection extensible.

Figure 1:
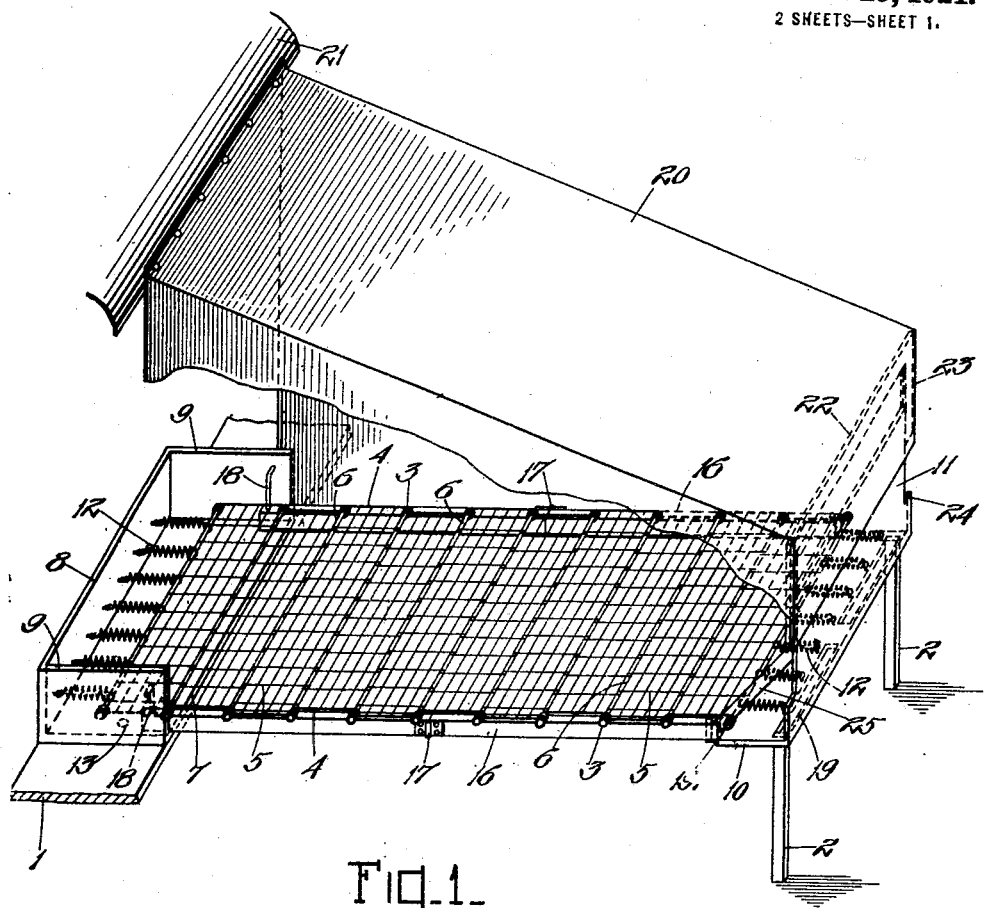
Figure 5:
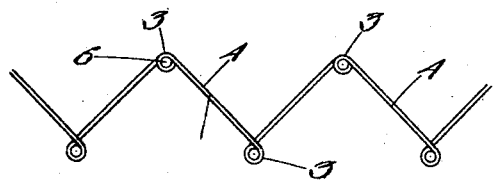
Fig. 5 is a side elevation partly broken away at each end showing the several connected folding sections of the bed partially collapsed into bellows form.

Referring now to the drawings, 1 represents the running board of an automobile on which the box containing the folded bed is carried and which serves also as a support for one end of the bed when opened out for use, the outer end of the bed being supported when in use by folding legs 2—2, as will be more particularly described hereinafter. The spring bed or mattress is made up of a series of sections hinged together so as to be collapsible in a sort of bellows form and having springs 3 at the hinge lines to normally retain the bed in collapsed form. The bed also has springs 12 at the head and foot sections to make elastic connection with the head and foot boards, as will be more particularly described hereinafter, so that the bed is hung on springs. Each bed section comprises preferably a woven or wire mesh body portion 5, and each section 5 which extends transversely the full width of the bed is connected on each side with a rod 6 which also extends transversely of the bed, that is lengthwise of each section. Said rods 6 serve not only to stiffen each section of the mesh body portion but also each rod serves as a hinge pin between each adjacent pair of sections.

The several hinge rods 6 are all connected together on each side by a heavy spring wire 4 which extends lengthwise of the bed, one on each side, and is formed with spring coils 3 wound around each one of the hinge rods respectively. These spring wires 4 are formed so as to be normally in the collapsed form shown in Fig. 4, and each coil or eye 3 through which the hinge rods pass forms a spring. When the bed is distended into the position shown in Fig. 1, these spring eyes are all under tension and tend to collapse the bed into the folded form shown in Fig. 4, and will do so except when they are held in restraint in extended position.

For convenience of description that portion of the bed which rests on the running board when it is in distended form will be referred to as the head of the bed and the outer end as the foot, and that is the way in which it is intended to be used although it is obvious that it may be reversed if desired.

The box or casing within which the collapsed bed spring is folded and which also forms a portion of the bed itself, comprises a base or bottom portion 7, a vertical rear wall portion 8 which serves as the headboard of the bed, two opposite vertical end portions 9—9 which incase two sides of the folded bed, a front wall portion 10 which when the box is closed is in vertical position as shown in Fig. 2, but which when in the distended form of the bed is in horizontal position, and the top 11 which when the box is folded forms a top cover for the box but which when the bed is distended is turned into a vertical position as shown in Fig. 1. The base portion 7, the head portion 8, and the two opposite end portions 9—9 are rigidly connected together and are attached to the running board 1 by bolts 13.

The hinge rod 6 which is nearest the head of the bed has a plurality of coil springs 12 which are connected at one end therewith, the other end of said springs being connected with the head board 8.

The hinge rod 6 which is nearest the foot of the bed also is connected with the front wall 10 of the box by a series of coil springs 12. Both sets of said springs 12 at the head and foot are stretched from the position shown in Fig. 4 when the bed is closed to the position shown in Fig. 1 when it is open. These springs 12 serve as elastic hangers for the bed.

On each side of the bed when in its distended form, as shown in Fig. 1, are supporting bars 16, each of which is made up of two parts hinged together by a hinge 17. The front wall portion 10 and the cover portion 11 are rigidly connected together, and the said front portion 10 is hinged as indicated at 191 to the outer ends of the side supporting bars 16, as shown in Fig. 1, so that when the bed is drawn out the said front wall 10 may be swung down into horizontal position which at the same time will bring the cover portion 11 from its horizontal position up into a vertical position. The other ends of the bars 16 are pivotally connected with pivot pins 18 which are connected with the upright end walls 9 of the box.

The side supporting rails 16 are hinged together in such manner that when they are folded the hinged ends will move in toward the center of the bed.

The hinge rods 6 of the bed rest at each end on top of the side rails 16 as a support, resting loosely thereon, except the extreme hinge rod at each end of the bed.

The legs 2—2 have a hinge connection with the wall 10 which as stated is the front wall when the box is closed, and which is turned down into horizontal position when the bed is in its extended form. These are hinged in such manner that they can be folded up toward each other when the bed is collapsed. Preferably the board 10 is formed with slots 19—19 of sufficient width and length to receive the legs 2—2 when they are folded up so that they will be entirely inclosed in the slots. These legs might be made from the piece which is sawed out from the board 10 in making the slot and thus economize in material. This is not necessary, however.

I provide a canopy or curtain top 20 to form a roof for the bed when in use. When not in use this canopy top may be rolled up and packed away with the bed. When it is in use one end of it may be connected with the top 21 of the automobile by means of buttons and buttonholes, or other suitable fastenings, and the other end may be connected with the foot-board of the bed. I prefer to make the foot-board extensible. As already stated the portion 11 which forms the top of the box, as will be seen in Figs. 3 and 4, is swung over into a vertical position as in Fig. 1 when the bed is extended, and this forms the main foot-board. I prefer, however, to have an extension member connected with the foot-board 11 to which the outer end of the canvas top 20 is connected so that the outer end of the canvas top will be raised to a higher elevation than if attached to the part 11. The extension member which I have provided is shown in Fig. 1, and is as follows:

A transverse strip or bar 22 is provided to which the canvas 20 may be buttoned, and this transverse strip has connected with each end thereof, a downwardly extending bar 23, and the two bars 23—23 have a sliding engagement with the foot-board 11. The preferred method is to make this a tongue and groove connection, the side rails 23 being grooved and the foot-board 11 being provided with a tongue to fit in the groove. The foot-board 11 is preferably rabbeted at each end forming a shoulder 24 upon which the lower end of the rail 23 may rest when the rails 23 are pushed down to the lowermost position. This tongue and groove connection should preferably have sufficient friction so that the canvas supporting rail 22 may be adjusted to varying elevations and retained in its adjusted position. If the friction is not sufficient any suitable retaining device may be employed.

When it is desired to fold up the bed from the position shown in Fig. 1, the canvas top 20 will be unbuttoned from the rail 22, then the canvas supporting rail will be pushed down to rest on top of the board 11. The legs 2—2 will be folded into their respective slots 19, the side supporting rails 16 will be folded on their hinges, each folding inward under the bed and at the same time the bed itself made up of the several hinged sections will be collapsed in bellows form until it shuts back in folded position in the box, as shown in Fig. 4. The front wall 10 of the box will be folded up into vertical position and the footboard 11 with its extension portions 22—23 will be turned over to form the top of the box, and thus all parts of the bed will be in compact form, the spring portion being entirely inclosed within the box portion, while the box as already described occupies only the width of the running board. There are provided braces 25 which extend from the foot-board member 11 to the side supporting rails 16 to brace the foot-board when the bed is extended.

It is obvious that instead of being attached to the running board of an automobile, the device can be attached to any suitable support; for instance, it is adapted for house use.

If the car with which the bed is to be connected has a short running board, there may not be sufficient space for a full length bed unless some modification is made from the form shown in Fig. 1. In order to provide for a full length bed to be used in connection with a short running board, I provide an extension arrangement as shown in Fig. 6. Instead of having the pivots 18 for the side bars 16 attached direct to the side walls 9 of the box, the said pivots are connected with a slide member 26, as shown in Fig. 6, one at each side of the box. This side member is formed with a longitudinal slot 27 which is engaged by a guide pin 28 so that the slide members may be moved outward a distance equal to the length of the slot. By making the slide members extend from the rear to the front of the interior of the box, there is thereby gained that much in the length of the bed.

The slot 27 in the slide member is formed with a vertical branch 29 at its rear end which will be engaged by the pin 28 when the slide is pulled out far enough, and the slide is formed with a rabbet 30 in its under side so that when the slide is drawn out far enough for the vertical portion 29 of the slot to come into alinement with the guide pin 28, the slide member may drop to bring the pin into the upper part of the vertical slot and this, together with the shoulder 31 coming against the front edge of the bottom of the box or of the running board, will hold the slide member against backward sliding movement. The side bar 16 and the wire bed frame will drop with the slide member 26.

What I claim is:—

1. A folding bed attachment composed of a plurality of sections hinged together which are adapted to be folded up in bellows formation and to be spread out in extended form in flat formation, the several sections being provided with springs at their pivot connections with each other, which normally retain the bed in its collapsed form and which are placed under tension when the bed is extended.

2. A folding bed attachment composed of a plurality of sections hinged together, a hinge rod between each pair of adjacent sections to which they are connected, two side rods, one on each side of the bed, composed of spring wire, each formed with a plurality of spring coils throughout its length forming eyes in which said hinge rods are journaled, said side rods being normally in collapsed form with the several sections folded in bellows formation, the said sections being adapted to be straightened out into flattened form and thereby putting the said springs under tension, means for securing one end of the bed in its flattened form to a support, and folding legs connected with the other end of the bed which are adapted to be set up to support the outer end of the bed in its extended form.

3. A folding bed attachment composed of a plurality of sections hinged together, a hinge rod between each pair of adjacent sections to which they are connected, two side rods one on each side of the bed composed of spring wire, each formed with a plurality of spring coils throughout its length forming eyes in which said hinge rods are journaled, said side rods being normally in collapsed form with the several sections folded in bellows formation, said bed sections being adapted to be straightened out into flattened form, a casing for the bed in its collapsed form, said casing having a bottom member, and means for securing the same to a support, a head wall member to which the head of the bed is connected, a front wall member which forms the front of the box when it is closed and which is separable from the fixed portion of the box, the foot of the bed having hinged connection with the said front wall, whereby when the bed is extended the front wall may be turned down into horizontal position, a cover for the box in its closed position which is connected with said front wall and which is turned up into vertical position to form a foot-board when the bed is extended, and folding legs connected with said front wall.

4. A folding bed attachment composed of a plurality of sections hinged together, a hinge rod between each pair of adjacent sections to which they are connected, two side rods one on each side of the bed composed of spring wire, each formed with a plurality of spring coils throughout its length forming eyes in which said hinge rods are journaled, said side rods being normally in collapsed form with the several sections folded in bellows formation, the said bed sections being adapted to be straightened out into flattened form, a casing for the bed in its collapsed form, said casing having a bottom member and means for securing the same to a support, a head wall member to which the head section of the bed is connected, a front wall member which forms the front of the box when it is closed, and which is separable from the fixed portion of the box, the foot section of the bed having hinged connection with the said front wall, whereby when the bed is extended the front wall may be turned down into horizontal position, a cover for the box in its closed position which is connected with said front wall and which is turned up into vertical position to form a foot-board when the bed is extended, and folding legs connected with said front wall, the said front wall being formed with slots into which the said legs are folded when the bed is in its collapsed position.

5. A folding bed attachment composed of a plurality of sections hinged together, which are adapted to be folded up in bellows formation and to be spread out in extended form in flat formation to form the bottom of the bed, springs connected with the hinges which normally maintain the bed in its collapsed bellows form, a box adapted to be mounted on a support within which the folding portion of the bed is inclosed, and which forms a part of the supporting portion of the bed, the front wall and top of the box being separable from the bottom and rear portion of the box, one end of the said bed bottom being connected with a fixed portion of the said box by springs, the outer end of the bed bottom being connected by springs with the front wall of the box, said front wall being hinged also to the bed bottom in such manner that it can be turned down into horizontal position, and folding legs connected with said hinged front wall.

6. A folding bed attachment composed of a plurality of sections hinged together, which are adapted to be folded up in bellows formation and to be spread out in extended form in flat formation to form the bottom of the bed, a two-part box, one portion of which is attached to a support, and the other part of which is movable with relation to the said fixed part, said two portions forming an inclosure for the bed bottom when in its collapsed form, one end of said bed bottom being connected with the fixed portion of the box and the other end of the bed bottom being connected with the movable portion of the box, and folding legs connected with the said movable portion of the box to support the outer end of the bed when in its extended form, said movable portion of the box having connected therewith a portion which when the box is closed forms the cover, and which is adapted to be turned up into vertical position to form the foot-board when the bed is in its extended form.

7. A folding bed attachment composed of a plurality of sections hinged together, which are adapted to be folded up in bellows formation and to be spread out in extended form in flat formation to form the bottom of the bed, a two-part box, one portion of which is attached to the running board of an automobile, and the other part of which is movable with relation to the said fixed part, said two portions forming an inclosure for the bed bottom when in its collapsed form, one end of said bed bottom being connected with the fixed portion of the box and the other end of the bed bottom being connected with the movable portion of the box, and folding legs connected with the said movable portion of the box to support the outer end of the bed when in its extended form, said movable portion of the box having connected therewith a portion which when the box is closed forms the cover, and which is adapted to be turned up into vertical position to form the foot-board when the bed is in its extended form, said foot-board member being vertically extensible when it is in its open position, said extension being provided with means for connection with a canopy top for the bed.

8. A folding bed comprising a plurality of sections of wire mesh hinged together in such manner that said sections may be folded together in bellows form, and springs which retain the bed normally in collapsed form.

9. A folding bed comprising a plurality of sections of wire mesh hinged together in such manner that said sections may be folded together in bellows form, and springs which retain the bed normally in collapsed form, in combination with a foot-board having hinged connection with one end of said bed, and a head-board having hinged connection with the other end of said bed, said foot-board and head-board forming two sides of a box to inclose the bed when the bed is in collapsed form.

10. A folding bed composed of a plurality of sections hinged together, a hinge rod between each pair of adjacent sections to which they are connected, two side rods one on each side of the bed composed of spring wire, each formed with a plurality of spring coils throughout its length forming eyes in which said hinge rods are journaled, said side rods being normally in collapsed form with the several sections folded in bellows formation, said bed sections being adapted to be straightened out into flattened form, a casing for the bed in its collapsed form, said casing having a bottom member, and means for securing the same to a support, a head wall member to which the head of the bed is connected, a front wall member which forms the front of the box when it is closed and which is separable from the fixed portion of the box, the foot of the bed having hinged connection with the said front wall, whereby when the bed is extended the front wall may be turned down into horizontal position, a cover for the box in its closed position which is connected with said front wall and which is turned up into vertical position to form a foot-board when the bed is extended, folding legs connected with said front wall, and moldable bottom supporting rails for the bed near each side thereof, one end of each of said rails being connected with the fixed portion of the box which is at the head of the bed, and the other end being connected with the movable portion of the box at the foot of the bed.

11. A folding bed comprising a plurality of sections of wire mesh hinged together in such manner that said sections may be folded together in bellows form, and springs which retain the bed normally in collapsed form, in combination with a foot-board having hinged connection with one end of said bed, and a head-board having hinged connection with the other end of said bed, said foot-board and head-board forming two sides of a box to inclose the bed when the bed is in collapsed form, two foldable bottom supporting rails for the said wire sections, one near each side, one end of each foldable rail being connected with the fixed portion of the box at the head, and the other end being connected with the movable foot portion of the box.

12. A folding bed comprising a plurality of sections of wire mesh hinged together in such manner that said sections may be folded together in bellows form, and springs which retain the bed normally in collapsed form, in combination with a foot-board having hinged connection with one end of said bed, and a head-board having hinged connection with the other end of said bed, said foot-board and head-board forming two sides of a box to inclose the bed when the bed is in collapsed form, two foldable bottom supporting rails for the said wire sections, one near each side, one end of each foldable rail being connected with the fixed portion of the box at the head, and the other end being connected with the movable foot portion of the box, each bottom supporting rail being a two-part rail which is hinged intermediate its ends.

In testimony whereof I affix my signature.

ALBERT N. WHITE.